(12) United States Patent
Auld et al.

(10) Patent No.: US 10,412,441 B2
(45) Date of Patent: Sep. 10, 2019

(54) SYSTEMS, METHODS, AND DEVICES FOR HIGH-BANDWIDTH DIGITAL CONTENT SYNCHRONIZATION

(71) Applicant: RGB Spectrum, Alameda, CA (US)

(72) Inventors: Lynton Auld, Rohnert Park, CA (US); Scott Norder, Oakland, CA (US); Thomas McCurdie, San Francisco, CA (US)

(73) Assignee: RGB Spectrum, Alameda, CA (US)

( * ) Notice: Subject to any disclaimer, the term of this patent is extended or adjusted under 35 U.S.C. 154(b) by 0 days.

(21) Appl. No.: 15/833,996

(22) Filed: Dec. 6, 2017

(65) Prior Publication Data

US 2018/0176630 A1    Jun. 21, 2018

Related U.S. Application Data

(60) Provisional application No. 62/430,846, filed on Dec. 6, 2016.

(51) Int. Cl.
*H04N 21/43* (2011.01)
*H04N 21/2365* (2011.01)
*H04N 21/2381* (2011.01)
*H04N 21/61* (2011.01)
*H04N 21/8358* (2011.01)
*H04N 21/414* (2011.01)

(52) U.S. Cl.
CPC ..... *H04N 21/4307* (2013.01); *H04N 21/2381* (2013.01); *H04N 21/23655* (2013.01); *H04N 21/4305* (2013.01); *H04N 21/6112* (2013.01); *H04N 21/6125* (2013.01); *H04N 21/8358* (2013.01); *H04N 21/41415* (2013.01)

(58) Field of Classification Search
None
See application file for complete search history.

(56) References Cited

U.S. PATENT DOCUMENTS

| 6,546,190 | B1 | 4/2003 | Phillips et al. |
| 7,088,774 | B1 * | 8/2006 | Moni ................ H04N 21/4307 375/240 |
| 7,669,113 | B1 | 2/2010 | Moore et al. |
| 8,819,749 | B2 | 8/2014 | De Nijs et al. |
| 9,154,834 | B2 * | 10/2015 | Erickson ............ H04N 21/4307 |
| 2002/0133247 | A1 | 9/2002 | Smith et al. |

(Continued)

*Primary Examiner* — Samira Monshi
(74) *Attorney, Agent, or Firm* — Kwan & Olynick LLP

(57) ABSTRACT

Systems for high-bandwidth digital content synchronization include transmitters including encoders, where each encoder is configured to encode one or more media steams. Systems further include receivers including decoders, where each decoder is configured to decode the one or more media streams. Decoders further include at least one packet receiver and at least one buffer, the buffer having a configurable buffer depth. Systems also include display devices configured to display outputs of the decoders, and a coordinator communicatively coupled to the encoders and the decoders. The coordinator includes one or more processors configured to start media streams being encoded by the encoders and decoded by the decoders, synchronize the media streams while the media streams are being buffered by the decoders, and implement a synchronized switching event associated with the media streams.

20 Claims, 11 Drawing Sheets

(56) References Cited

U.S. PATENT DOCUMENTS

| | | | |
|---|---|---|---|
| 2007/0269181 A1* | 11/2007 | Kikuchi | G11B 27/005 386/346 |
| 2010/0091188 A1 | 4/2010 | Maiti et al. | |
| 2013/0170561 A1* | 7/2013 | Hannuksela | H04N 21/23424 375/240.25 |
| 2016/0286260 A1 | 9/2016 | Lawrence et al. | |

* cited by examiner

SYSTEMS, METHODS, AND DEVICES FOR HIGH-BANDWIDTH DIGITAL CONTENT SYNCHRONIZATION

CROSS-REFERENCE TO RELATED APPLICATIONS

This application claims the benefit under 35 U.S.C. § 119(e) of U.S. Provisional Patent Application No. 62/430,846, filed on Dec. 6, 2016, which is incorporated herein by reference in its entirety for all purposes

TECHNICAL FIELD

The present disclosure relates to the field of internet protocol (IP) networks, and more particularly to synchronization of transmissions over IP networks.

DESCRIPTION OF RELATED ART

Digital media content may include audio and visual information that may be rendered and displayed at display devices. Such digital media content may be transmitted over a communications network for display at a target display device. Accordingly, a transmitter may generate a media stream that is a stream of data that represents the digital media content. The media stream may be transmitted over the communications network and may be provided to one or more display units for display. While such digital media content may be transmitted over a communications network, traditional techniques are limited because communications networks used for transmission of digital content may introduce delays that may desynchronize operations associated with the transmission and display of such digital content, such as encoding and decoding.

SUMMARY

Disclosed herein are systems, methods, and devices for high-bandwidth digital content synchronization. Systems include a plurality of transmitters comprising a plurality of encoders, wherein each encoder of the plurality of the encoders includes one or more processors configured to encode one or more media steams. Systems further include a plurality of receivers comprising a plurality of decoders, wherein each decoder of the plurality of decoders includes one or more processors configured to decode the one or more media streams, the decoder further comprising at least one packet receiver and at least one buffer, the buffer having a configurable buffer depth. Systems also include a plurality of display devices configured to display a plurality of outputs of the plurality of decoders, a coordinator communicatively coupled to the plurality of encoders and the plurality of decoders. The coordinator includes one or more processors configured to start a plurality of media streams being encoded by the plurality of encoders and decoded by the plurality of decoders, synchronize the plurality of media streams while the plurality of media streams is being buffered by the plurality of decoders, and implement a synchronized switching event associated with the plurality of media streams.

In some embodiments, the synchronizing of the plurality of media streams includes adjusting a buffer size of each of the decoders associated with the plurality of media streams. According to some embodiments, the implementing of the synchronized switch event further includes determining a coordination time window associated with the synchronized switch event, and configuring at least some of the plurality of decoders to implement the synchronized switch event. In various embodiments, the synchronized switch event switches at least two outputs of the plurality of decoders to at least two of the plurality of media streams that are being buffered. In some embodiments, at least some of the plurality of encoders and the plurality of decoders have different latencies. According to some embodiments, the plurality of decoders is configured to generate outputs displayed on a display device. In various embodiments, the display device is configured to have multiple display windows. In some embodiments, the plurality of media streams is high-bandwidth digital content (HDCP) compliant.

Further disclosed are systems that may include a plurality of encoders, wherein each encoder of the plurality of the encoders includes one or more processors configured to encode one or more media steams. The systems may further include a plurality of decoders, wherein each decoder of the plurality of decoders includes one or more processors configured to decode the one or more media streams, the decoder further comprising at least one packet receiver and at least one buffer, the buffer having a configurable buffer depth. Systems may also include a coordinator communicatively coupled to the plurality of encoders and the plurality of decoders. The coordinator may include one or more processors configured to start a plurality of media streams being encoded by the plurality of encoders and decoded by the plurality of decoders, synchronize the plurality of media streams while the plurality of media streams is being buffered by the plurality of decoders, and implement a synchronized switching event associated with the plurality of media streams.

In some embodiments, the synchronizing of the plurality of media streams includes adjusting a buffer size of each of the decoders associated with the plurality of media streams. According to some embodiments, the implementing of the synchronized switch event further includes determining a coordination time window associated with the synchronized switch event, and configuring at least some of the plurality of decoders to implement the synchronized switch event. In various embodiments, the synchronized switch event switches at least two outputs of the plurality of decoders to at least two of the plurality of media streams that are being buffered. In some embodiments, at least some of the plurality of encoders and the plurality of decoders have different latencies. According to some embodiments, the plurality of decoders is configured to generate outputs displayed on a display device. In various embodiments, the display device is configured to have multiple display windows. In some embodiments, the plurality of media streams is high-bandwidth digital content (HDCP) compliant.

Also disclosed herein are methods that may include streaming a plurality of media streams in a background, the plurality of media streams being encoded by the plurality of encoders and decoded by the plurality of decoders. The methods further include synchronizing, using one or more processors of a coordinator, the plurality of media streams while the plurality of media streams is being buffered by the plurality of decoders, and implementing, using one or more processors of the coordinator, a synchronized switching event associated with the plurality of media streams, the synchronized switching event switching at least two outputs of the plurality of decoders to at least two of the plurality of media streams that are being buffered.

In some embodiments, the synchronizing of the plurality of media streams includes adjusting a buffer size of each of the decoders associated with the plurality of media streams.

According to some embodiments, the implementing of the synchronized switch event further includes determining a coordination time window associated with the synchronized switch event, and configuring at least some of the plurality of decoders to implement the synchronized switch event. In various embodiments, the plurality of media streams is high-bandwidth digital content (HDCP) compliant.

DETAILED DESCRIPTION

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

Digital media content may be transmitted as media streams across a distributed environment. Accordingly, such media streams may be transmitted from various different locations to various different locations, and ultimately displayed at one or more display devices. In various embodiments, multiple media streams may be provided to multiple display windows of display devices to be presented as a single unified display. An example of such a display may be a 4×4 monitor array that displays a single viewing canvas. In such an example, the four monitors are used in conjunction to emulate a single larger display. Moreover, such monitors may each be provided with its own media stream, and may all be within a line of sight of the same user.

Media streams may be transmitted over communications networks that may include packet-switched infrastructure. Accordingly, such communications networks may incur delays and latencies. Because, as discussed above, nodes may be implemented in a distributed fashion, and different nodes may incur different latencies due to varying traversals over various communications networks, conventional switching techniques implemented across multiple nodes may implement a switch of multiple media streams at different times and in a desynchronized manner. Accordingly, in the example above, the switch of the media streams provided to the 4×4 monitor array, would not be synchronous, and would result in poor performance.

Various embodiments disclosed herein provide synchronization of switching events associated with such display units. More specifically, one or more components, such as a coordinator, may specifically configure nodes associated with the media streams to implement the switch at a designated coordinated time. As will be discussed in greater detail below, such synchronization may be implemented at an encoder level and/or at a decoder level, and may be applied across multiple different nodes that may be implemented in a distributed fashion. In this way, embodiments disclosed herein may implement switching events in a synchronized manner that switches multiple media streams in a manner that appears simultaneous to the user, and remains synchronized despite communications network latencies or other temporal factors.

Figure 1:
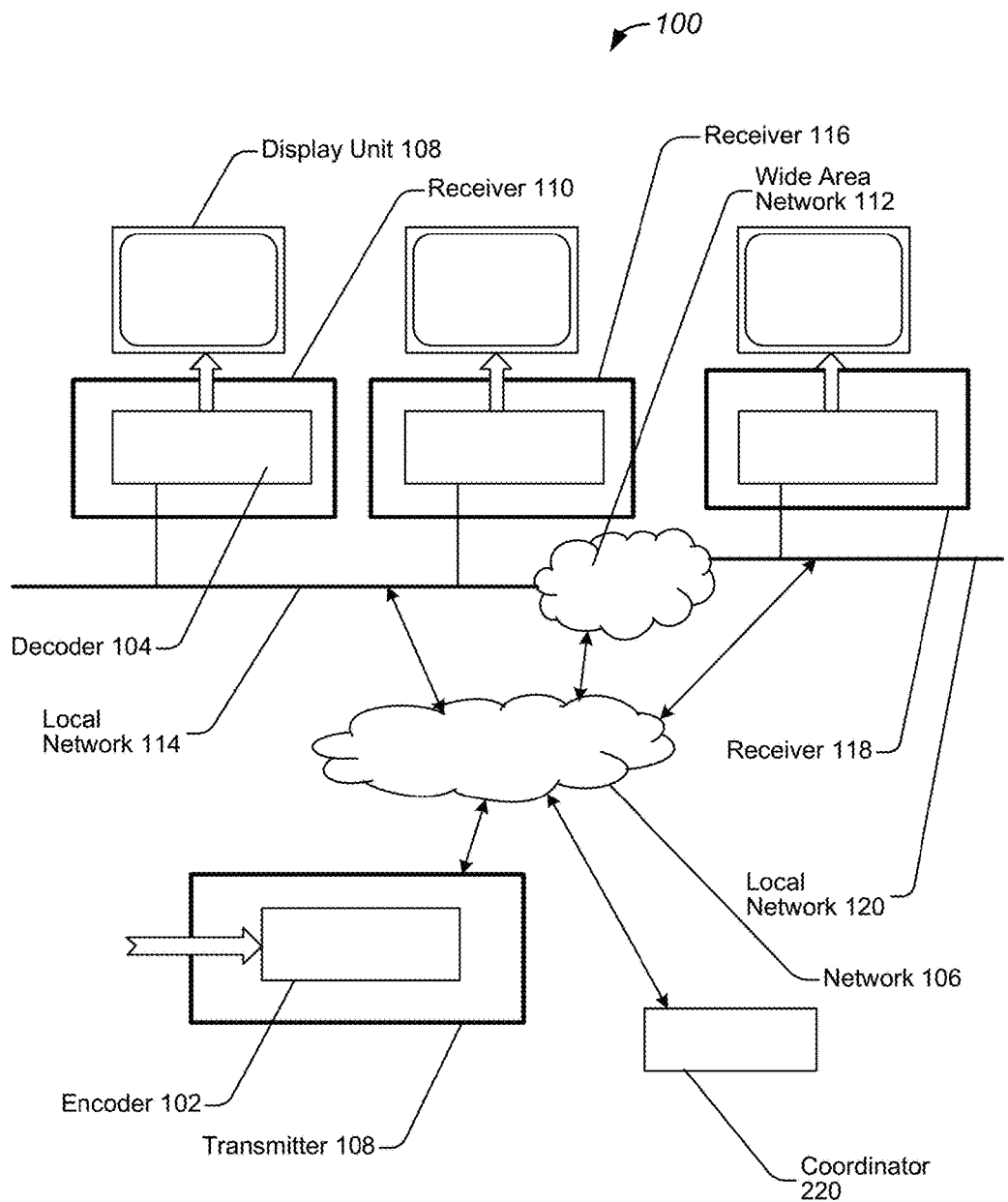
FIG. 1 illustrates an example of a system for implementing digital content synchronization, configured in accordance with some embodiments.

FIG. 1 illustrates an example of a system for implementing digital content synchronization, configured in accordance with some embodiments. As will be discussed in greater detail below, systems disclosed herein, such as system 100, may include various transmitters and receivers that may include encoders and decoders, respectively, that may be implemented on physical nodes. Moreover, the transmission and reception of such media streams may be implemented via various different networks that may have varying latencies and transmission characteristics. As will be discussed in greater detail below, one or more system components may be configured to coordinate such latencies, and synchronize media streams.

In various embodiments, system 100 may include various transmitters that include encoders, such as encoder 102. Accordingly, system 100 may include various transmitters that may be configured to generate media streams. For example, the transmitters may be configured to encode media streams so that they may be generated and transmitted in a manner compliant with a content protection standard, such as high-bandwidth digital content (HDCP). Accordingly, a particular transmitter, such as transmitter 108, may include various ports or interfaces that are configured to receive media signals for transmission. As discussed above, such a media signal may include audio and video information. In various embodiments, encoders, such as encoder 102, may be configured to encode the received signal for transmission over a network, such as network 106 discussed in greater detail below. In various embodiments, encoder 102 may be configured to implement the packetization of the received media content as well as the implementation of one or more content protection protocols. In this way, streams may be packetized for network transmission, and in a manner that is compliant with one or more content protection protocols, such as HDCP.

Moreover, as will be discussed in greater detail below, encoders may be configured to generate a relative time indicator, such as a presentation time stamp (PTS), and include such a relative time indicator in the media stream. In various embodiments, the PTS may indicate to a target decoder when associated information, such as elements of a stream, is to be displayed. As also discussed in greater detail below, the time identified by the PTS may be generated based on a clock included in the encoder, and may be relative to the encoder that has generated the stream.

It will be appreciated that a particular transmitter may include multiple encoders and may be configured to generate and transmit multiple media streams. In this way, transmitter 108 may include numerous encoders, and may be configured to receive multiple streams for encoding concurrently. Accordingly, transmitter 108 may be configured for various types of transmission, such as 1-1 transmission in which one stream is provided to one source. Transmitter 108 may also be configured for 1-M transmission in which one stream is provided to multiple sources simultaneously. As shown in FIG. 1, a transmitter, such as transmitter 108, may transmit a media stream to several receivers that include encoders, such as receiver 110, receiver 116, and receiver 118.

In various embodiments, system 100 may include multiple transmitters that may have various different transmission characteristics and capabilities. As discussed above, the transmitters may have different configurations of numbers of targets and numbers of media streams generated. Moreover, the transmitters may have different hardware and communications capabilities, such as interface types, supported communications formats and protocols, as well as available transmission speeds.

System 100 may further include various receivers, such as receiver 110, that may be configured to receive media streams, and decode such media streams so that they may be displayed at display devices of a display unit, such as display unit 108 which will be discussed in greater detail below with reference to FIG. 2. Accordingly, a receiver, such as receiver 110, may be configured to decode the media streams so that they may be displayed on the previously described display devices of display units. Moreover, receivers, such as receiver 110, may be configured to route the media streams to their appropriate destinations which may be target windows of display units. In various embodiments, there may be multiple different receivers that may have different capabilities. For example, a first receiver may be associated with two display devices, while a second receiver is associated with three display devices, and third receiver is associated with four display devices. In this way, system 100 may include multiple different types of receivers that have different configurations and display capabilities.

As shown in FIG. 1, the media streams may be packetized and sent over a communications network, such as network 106. However, in various embodiments, additional communications networks may exist that facilitate communication between the receivers, as well as other system components. For example, system 100 may include local network 114 which may couple various encoders included in receivers, such as receiver 110 and receiver 116. System 100 may also include additional local networks such as local network 120. In various embodiments, system 100 may also include wide area network 112 that may couple additional receivers, such as receiver 118. In this example, wide area network 112 may facilitate communications between receiver 118 and other receivers. As will be discussed in greater detail below, there may be communications delays associated with communications networks such as network 106 and wide area network 112 as packetized media streams are routed through such networks. In various embodiments, transmitters that include encoders, such as encoder 102, as well as receivers that include decoders, such as decoder 104, may be configured to implement one or more synchronization operations in conjunction with other components, such as coordinator 220 discussed in greater detail below, to ensure that the media streams, as well as switching events associated with such media streams, remain synchronized.

Figure 2:
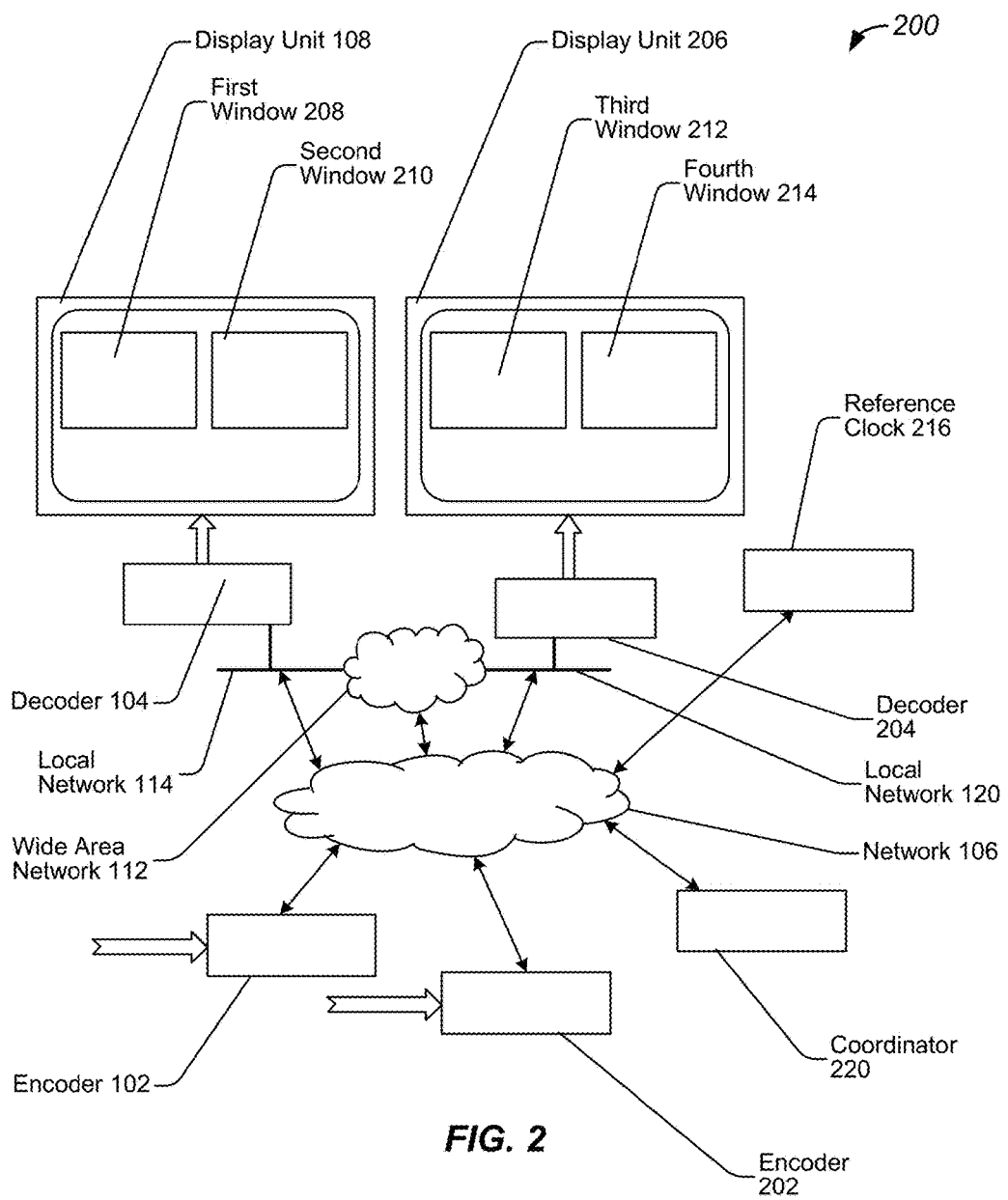
FIG. 2 illustrates another example of a system for implementing digital content synchronization, configured in accordance with some embodiments.

FIG. 2 illustrates another example of a system for implementing digital content synchronization, configured in accordance with some embodiments. As similarly discussed above, systems disclosed herein, such as system 200, may include various transmitters and receivers. Moreover, such systems may also include reference clocks that may be utilized to configure one or more system components to coordinate transmission related latencies, and synchronize media streams.

As similarly discussed above, a system, such as system 200, may include various encoders included in transmitters, such as encoder 102 and encoder 202. System 200 may also include various decoders included in receivers, such as decoder 104 and decoder 204. In various embodiments, system 200 may further include local network 114 and local network 120 which may be coupled via wide area network 112.

As also discussed above, system 200 may include display units such as display unit 108 and display unit 206. In various embodiments, such display units may each include numerous display devices, such as screens or monitors. According to some embodiments, each display device may include one or more display windows. For example, display unit 108 may include first window 208 and second window 210. Moreover, display unit 206 may include third window 212 and fourth window 214. In various embodiments, each display window may be a target or destination of a particular media stream. Accordingly, media streams may be generated by encoders 102 and 202, provided to decoders 104 and 204, and displayed on their associated display windows which may be first window 208, second window 210, third window 212 and fourth window 214.

As will be discussed in greater detail below, one or more synchronization operations may be implemented to synchronize the presentation of media streams on such display windows. Such synchronization operations may be implemented by a system component, such as coordinator 220. In various embodiments, coordinator 220 may be configured as a coordinator node that monitors and controls one or more groups of encoders and decoders. As will be discussed in greater detail below, coordinator 220 is configured to synchronize media streams that are being buffered by decoders, where such media streams are streams that may potentially be switched to. Coordinator 220 is further configured to implement a synchronized switching event. For example, coordinator 220 may configure several decoders to switch at a designated time such that their switch is synchronous.

As will also be discussed in greater detail below, such synchronization may be implemented by coordinator 220 at the encoders, at the decoders, or at a combination of both. In one example, a media stream may be provided to multiple destinations. More specifically, a single encoder may provide a media stream to multiple decoders and their associated displays. As discussed above, transmission of the media stream to the decoders may traverse various different communications networks, and result in various different latencies for different decoders. In this example, one or more synchronization operations may be implemented at the decoders. For example, coordinator 220 and the decoders may be configured to correlate a relative time indicator, such as a presentation time stamp included in the media stream, with another time indicator, such as reference clock 216 which may be a universal or objective time indicator. In various embodiments, the decoders may compare the PTS against the reference clock, and modify the presentation of the media stream based on the comparison. In this way, the presentation of the media stream at all target decoders may be synchronized and coordinated. As will be discussed in greater detail below with reference to FIG. 3, additional synchronization techniques as well as the modification of the presentation of media streams may be implemented via dynamic modification of the depth of buffers included in the decoders, and such modification may be implemented via coordinator 220.

Furthermore, such synchronization may be implemented at encoders as well. For example, the generation of the relative time indicators may be synchronized. More specifically, the generation of the PTS by encoders transmitting a media stream may be synchronized to an objective time indicator, such as reference clock 216. In various embodiments, the generation of the relative time indicators may be synchronized by locking the clocks of the encoders to reference clock 216. In this way, all of the source clocks may be synchronized and locked, and the generation of relative time indicators included in the media streams may be synchronized and locked.

Further still, switching events associated with media streams may be synchronized. As will be discussed in greater detail below, switching operations may switch between media streams being displayed on a display unit. In various embodiments, the switching events may be synchronized so that multiple media streams are switched at the same time. In some embodiments, the switching events may be synchronized by configuring the target destinations to implement the switch at a designated coordinated time. As will be discussed in greater detail below, such configuring may include dynamically modifying a depth of buffers included in the target destinations, which may include decoders, to synchronize the switch.

Figure 3:
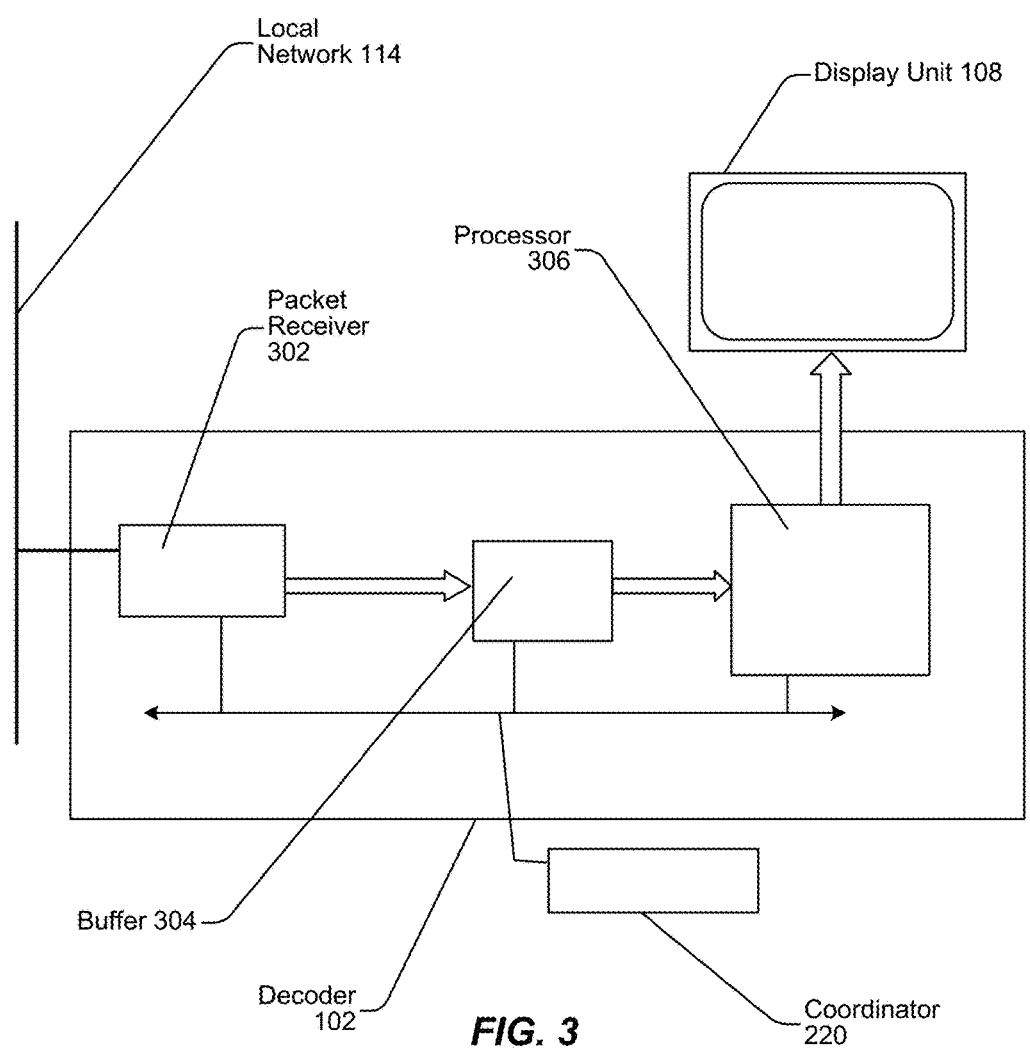
FIG. 3 illustrates an example of a device for implementing digital content synchronization, configured in accordance with some embodiments.

FIG. 3 illustrates an example of a device for implementing digital content synchronization, configured in accordance with some embodiments. As discussed above, synchronization may be implemented at a decoder, such as decoder 102. Accordingly, as will be discussed in greater detail below, decoder 102 may include various components that may receive media streams and decode such media streams for display at a display unit. Moreover, decoder 102 may be specifically configured to synchronize the display of the media streams such that their presentation is synchronized, and switching events associated with such media streams are also synchronized.

As discussed above, media streams may be received at decoder 102 via local network 114. Furthermore, decoder may be coupled with display unit 108, and may be configured to provide one or more media streams for display at display unit 108. As discussed above, display unit 108 may include multiple display devices and may support multiple display windows on each display device. Accordingly, decoder 102 may provide a media stream for display on a particular display window of display unit 108.

In various embodiments, decoder 102 may include packet receiver 302 which may be configured to receive a data stream as packetized data from local network 114, and provide the data stream to other components of decoder 102, such as buffer 304 which may be configured to receive a data stream from packet receiver 302, and buffer the data for a designated period of time, a designated number of bytes, and/or a designated number of frames or packets. As will be discussed in greater detail below, the designated buffer size may be determined based on a size or depth of the buffer, and may be modified by coordinator 220. In various embodiments, buffer 304 may pass the data stream along to another component, such as processor 306. Accordingly, decoder 102 may also include processor 306 which may be configured to implement decoding operations and generation of the media stream provided to display unit 108, as well as one or more of the synchronization operations discussed herein, such as modification of buffer 304.

Figure 4:
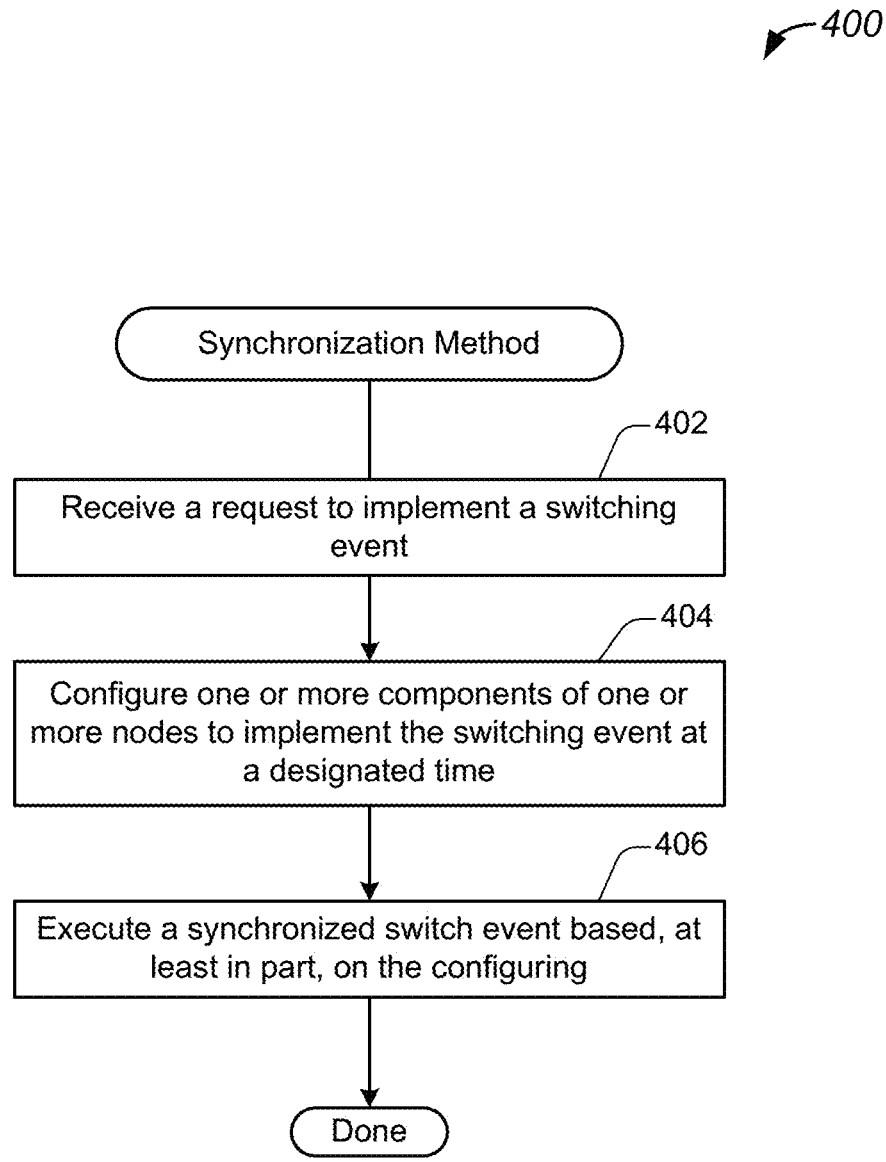
FIG. 4 illustrates a flow chart of an example of a method for synchronization of digital content, implemented in accordance with some embodiments.

FIG. 4 illustrates a flow chart of an example of a method for synchronization of digital content, implemented in accordance with some embodiments. As will be discussed in greater detail below, synchronized switching may be implemented when one or more entities, such as a user of a video display unit, provides an input indicating that changes should be made to the routing of one or more media streams that include video content. In various embodiments, such synchronize switching may provide the user with a switch of multiple media streams that appears simultaneous, and is synchronized despite various communications network latencies.

At operation 402, a request to implement a switching event may be received. As similarly discussed above, the switching event may be received from a user or a system component. The request may identify particular media streams currently being displayed, receivers and nodes at which they are currently being displayed, and media streams that are to be switched to. Accordingly, the request may include one or more switching parameters that may be used to identify the appropriate information that will form the underlying basis of the switch.

At operation 404, one or more components of one or more nodes may be configured to implement the switching event at a designated time. As will be discussed in greater detail below with reference to FIG. 5 and FIG. 6, a system component, such as a coordinator, may configure nodes used to implement receivers as well as their respective decoders, to prime themselves in preparation for the switch by a designated time. The system component may also configure them execute the switch event at a designated time. In this way, the coordinator may configure groups of decoders to implement the switch event in a coordinated manner, and the coordinator may oversee the switching process.

At operation 406, a synchronized switch event may be executed. Accordingly, the nodes used to implement receivers as well as their respective decoders may implement the switch event in accordance with the configuration provided by the coordinator. In this way, the nodes may implement the appropriate rerouting, and the new media streams that are to be switched to may be displayed at one or more display units. As discussed above, the switch may appear to the user as having occurred simultaneously.

Figure 5:
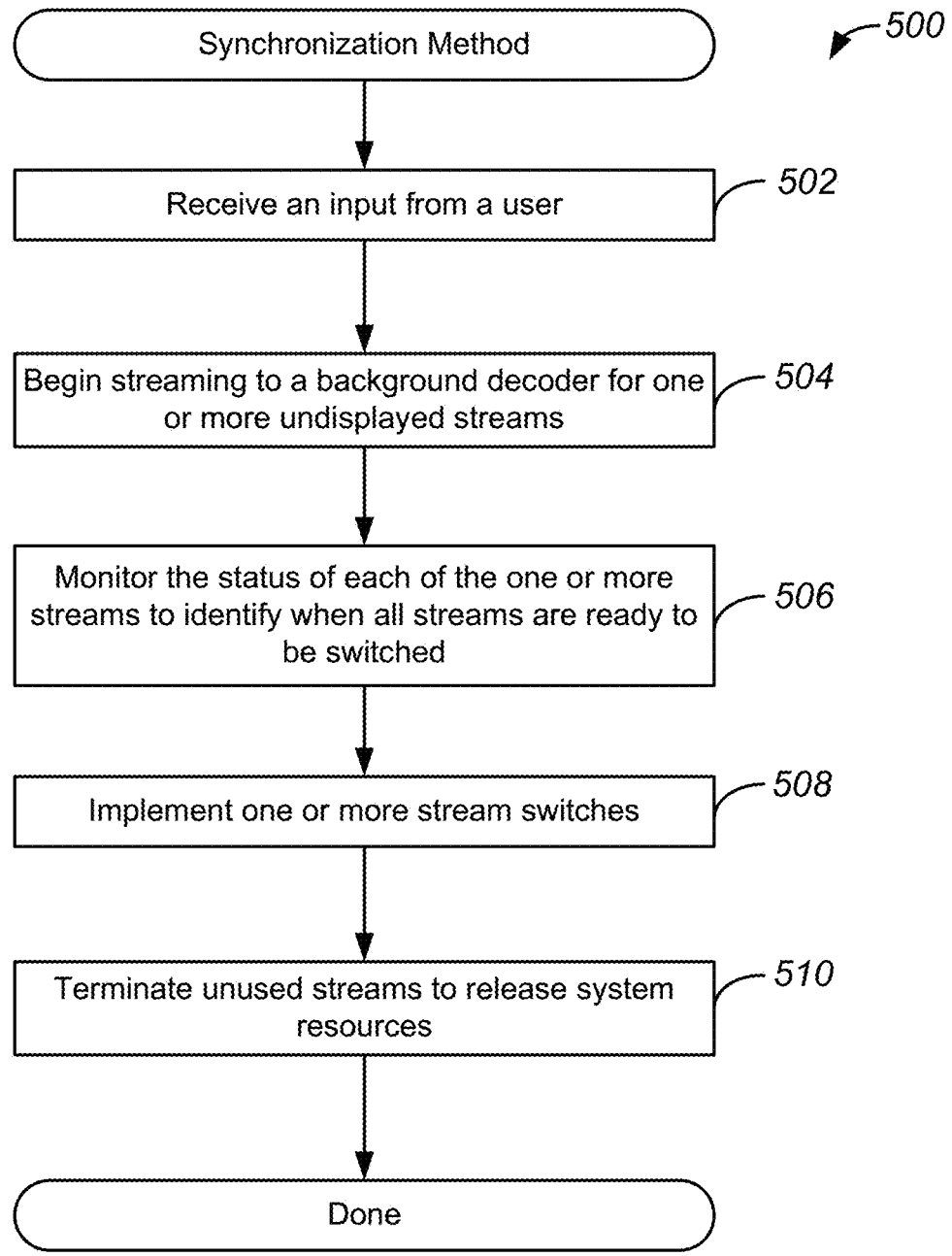
FIG. 5 illustrates a flow chart of another example of a method for synchronization of digital content, implemented in accordance with some embodiments.

FIG. 5 illustrates a flow chart of another example of a method for synchronization of digital content, implemented in accordance with some embodiments. In various embodiments, synchronized switching may be implemented when one or more entities, such as a user of a video display unit, provides an input that indicates that changes should be made to the routing of one or more media streams that include video content. In some embodiments, the video outputs may be driven by a single node, so the synchronization may be implemented within a single node. Accordingly, when a switch is requested, various operations may be implemented by one or more system components, such as decoders as well as a coordinator.

Accordingly, method 500 may commence with operation 502 during which an input from a user may be received. In various embodiments, the input may be received at a component, such as a coordinator. The input may indicate that a switch should be made for at least one media stream. Moreover, the input may include stream identifiers that identify streams currently displayed, as well as streams to be switched to. As discussed above a media stream may be currently displayed on a display unit that the user might be viewing. In some embodiments, during operation 502, some user feedback may be provided, such as the freeze framing of the affected content. Such feedback may be displayed while method 500 completes. In this way, the user may be provided with some visual input while the switch is implemented.

Method 500 may proceed to operation 504 during which streaming is started to at least one background decoder. Accordingly, the streams that are to be switched to may be provided to background decoder that are not currently being displayed. In this way, the streams may begin buffering and may be readied for display. As will be discussed in greater detail below, a system component, such as a coordinator, may be configured to implement additional synchronization to the background streams in anticipation of a switch event.

Method 500 may proceed to operation 506 during which a status may be monitored for at least one stream. Accordingly, a component, such as a coordinator, may monitor the status of each of the background streams. In various embodiments, each of the background decoders may generate a ready signal when ready for display. Accordingly, the coordinator may monitor the status of the background decoders and may be configured to identify when all background streams indicate they are ready for display.

In various embodiments, the coordinator may also be configured to account for additional statuses of the streams, such as when some streams become unavailable. For example, the coordinator may be configured to monitor a timeout of one or more of the media streams. More specifically, if one or more media streams do not generate a ready signal within a designated period of time, they may be ignored and/or restarted on another background decoder. In this way, inaccessible or unavailable streams will not delay the switch indefinitely. Moreover, according to some embodiments, the time taken to prepare the streams may be recorded. Such recorded times may be used to configure future switches to increase their efficiency. For example, streams and decoders took less time may be prioritized.

In various embodiments, method 500 may proceed to operation 508 during which one or more stream switches may be implemented. As discussed above, the switch may be implemented responsive to identifying that all streams are ready to implement the switch. In this way, all media streams may be switch simultaneously to implement a synchronized switch. In some embodiments, modification and/or adjustment of buffer depths is configured to provide synchronization of outputs independent of the implementation of a synchronized switch. In this way, outputs may be synchronized prior to switching, or after the implementation of a switch, as will be discussed in greater detail below.

Method 500 may proceed to operation 510 during which unused streams are selectively terminated. Accordingly, any media streams that were started at operation 504 and are not being currently used may be terminated. In this way, system resources associated with those unused media streams may be released and may be free to implement other operations.

Figure 6:
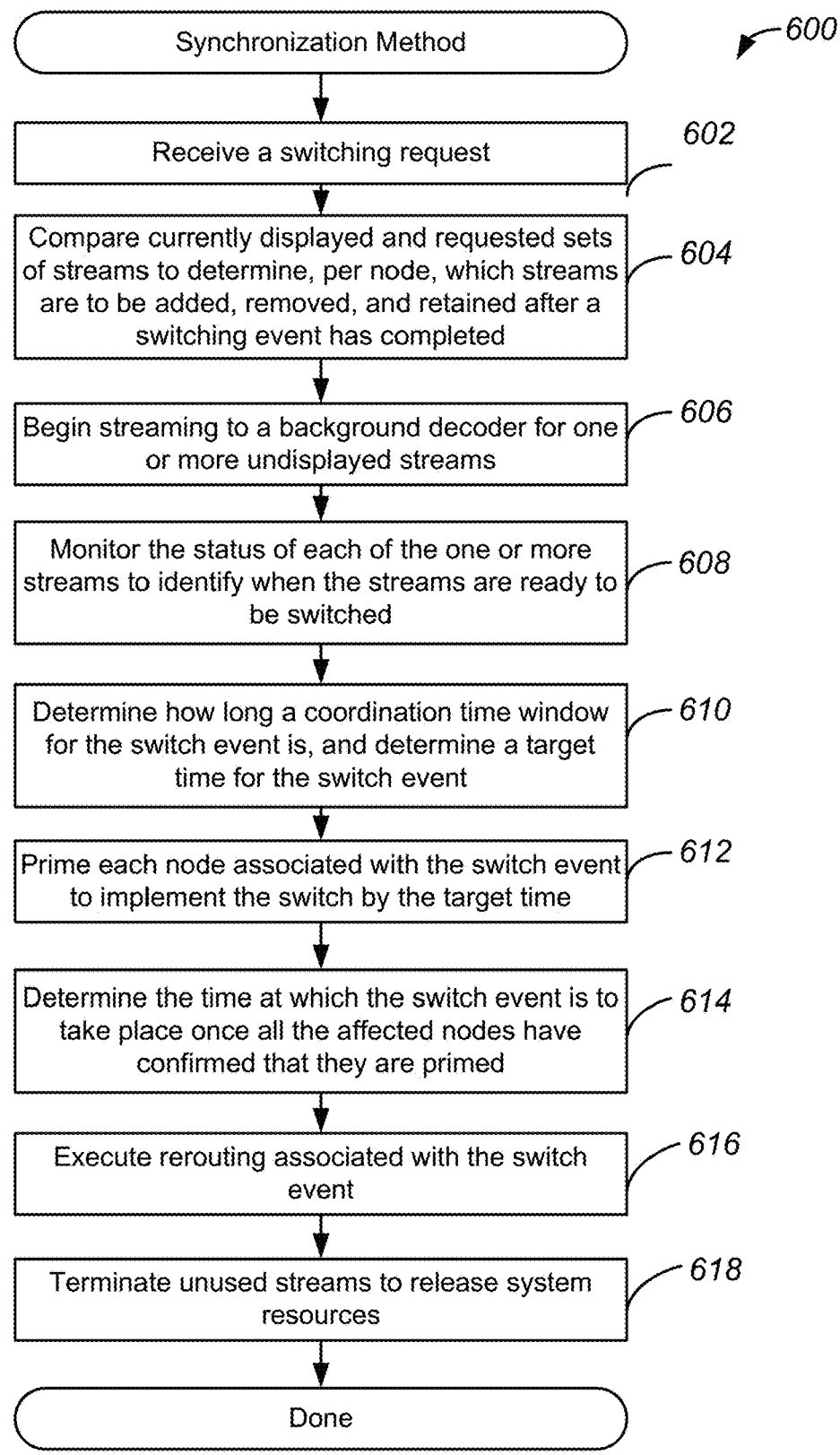
FIG. 6 illustrates a flow chart of yet another example of a method for synchronization of digital content, implemented in accordance with some embodiments.

FIG. 6 illustrates a flow chart of yet another example of a method for synchronization of digital content, implemented in accordance with some embodiments. As similarly discussed above, synchronized switching may be implemented when one or more entities, such as a user of a video display unit, provides an input that indicates that changes should be made to the routing of one or more media streams that include video content. As will be discussed in greater detail below, the video outputs may be driven by multiple different nodes that may be implemented in a distributed fashion. Accordingly, switching may be synchronized across multiple different nodes.

Accordingly, method 600 may commence with operation 602 during which a switch request may be received. As similarly discussed above, the switch request may be received as an input that may be received at a component, such as a coordinator. The input may indicate that a switch should be made for at least one media stream. Moreover, the input may include stream identifiers that identify streams currently displayed, as well as streams to be switched to. As also discussed above, during operation 602, some user feedback may be provided, such as the freeze framing of the affected content. Such feedback may be displayed while method 600 completes. In this way, the user may be provided with some visual input while the switch is implemented.

Method 600 may proceed to operation 604 during which the currently displayed media streams and requested sets of media streams compared. In various embodiments, the comparison may be performed to determine, per node, which media streams are to be added, which media streams are to be removed, and which media streams are to remain after the switching event has completed. Accordingly, a system component, such as a coordinator or a designated receiver implemented at each node, may identify media streams currently displayed at each node, compare that result against an estimate of media streams that will be displayed at each node after the requested switch, and identify differences between the two.

Method 600 may proceed to operation 606 during which streaming may be started to at least one background decoder on each node associated with the switch. As discussed above, the streaming may be started for previously undisplayed streams. In this way, the streams that are to be switched to may be provided to one or more background decoders that are not currently being displayed, and the streams may begin buffering so that they are readied for display.

Method 600 may proceed to operation 608 during which the coordinator monitors the status of each of these streams. As similarly discussed above, a component, such as a coordinator, may monitor the status of each of the background streams across the different nodes. In various embodiments, each of the background decoders may generate a ready signal when ready for display. Accordingly, the coordinator may monitor the status of the background decoders and may be configured to identify when all background streams indicate they are ready for display. Additional details regarding synchronization of outputs of decoders are discussed in greater detail below.

As also discussed above, the coordinator may also be configured to account for additional statuses of the streams implemented across the nodes, such as when some streams become unavailable. For example, the coordinator may be configured to monitor a timeout of one or more of the media streams. More specifically, if one or more media streams do not generate a ready signal within a designated period of time, they may be ignored and/or restarted on another background decoder. Moreover, the time taken to prepare the streams may be recorded, and such recorded times may be used to configure future switches to increase their efficiency.

Method 600 may proceed to operation 610 during which it may be determined how long a coordination time window for the switch should be, and a target time for the priming may also be determined. In various embodiments, the time window may represent an estimate of an amount of time required to prime the nodes to implement the switch, and a corresponding earliest available time to implement the switch. The time window may be determined based on a number of nodes used to implement the switch, and an anticipated amount of time for components, such as decoders, to switch streams and content. The target time may be determined based on the previously described coordination time window and one or more clocks which may be a locally implemented time of day clock, or a reference clock.

Method 600 may proceed to operation 612 during each node that is used in the switch may be primed to implement the priming by the target time. In some embodiments, a system component, such as the coordinator, may configure each node utilized in the switch, which may be slave nodes relative to the coordinator, to implement the priming by the target time. In various embodiments, each slave node confirms back to the coordinator that this priming process has been successfully completed. If a slave node does not receive this priming command within a specified timeout, it implements a predetermined action which may include executing the switch at the end of the coordination time window, or reverting to its original configuration. In various embodiments, the policy used by the slave nodes is consistent, thus ensuring that the system will remain in a state which is suitable to the user.

Method 600 may proceed to operation 614 during which a time to implement the switch may be determined. Accordingly, once all the affected nodes have confirmed that they are primed, a system component, such as the coordinator, may determine the time at which the switch event is to take place. The coordinator may command each node that the switch will occur at the determined time. Each slave node may respond to the coordinator as it completes the switch event, and the coordinator may monitor or track the state of each slave node in this process. In various embodiments, should a confirmation not be received by the coordinator, the coordinator may abort the switch event on the other nodes, or may allow the switch to proceed on the other nodes.

Method 600 may proceed to operation 616 during which each node independently executes the rerouting associated with the switch. Accordingly, each node and its respective decoders, may implement the switch such that the streams to be switched to are now decoded and provided to their associated display units for display. For example, an output of one decoder may be disconnected from a display, and an output of another decoder may be coupled to the display. In this way, coordinated switching may be implemented across multiple nodes.

Method 600 may proceed to operation 618 during which unused streams may be terminated to release those system resources. Accordingly, any media streams that were started at operation 606 and are not being currently used may be terminated. In this way, system resources associated with those unused media streams may be released and may be free to implement other operations.

Additional details are provided below regarding operations of the coordinator, encoders, and decoders. More specifically, FIG. 7, FIG. 8, and FIG. 9 relate to synchronization operations that may be used to synchronize various media streams. As discussed above, such media streams may be buffered and primed to be switched to if such a request is received. FIG. 10 describes additional details of a synchronized switch operation that may be implemented to switch to such media streams. In this way, features described in FIG. 7, FIG. 8, and FIG. 9 may be used to synchronize the streaming and buffering of media streams, and features described in FIG. 10 may be used to implement switches to such streams.

Figure 7:
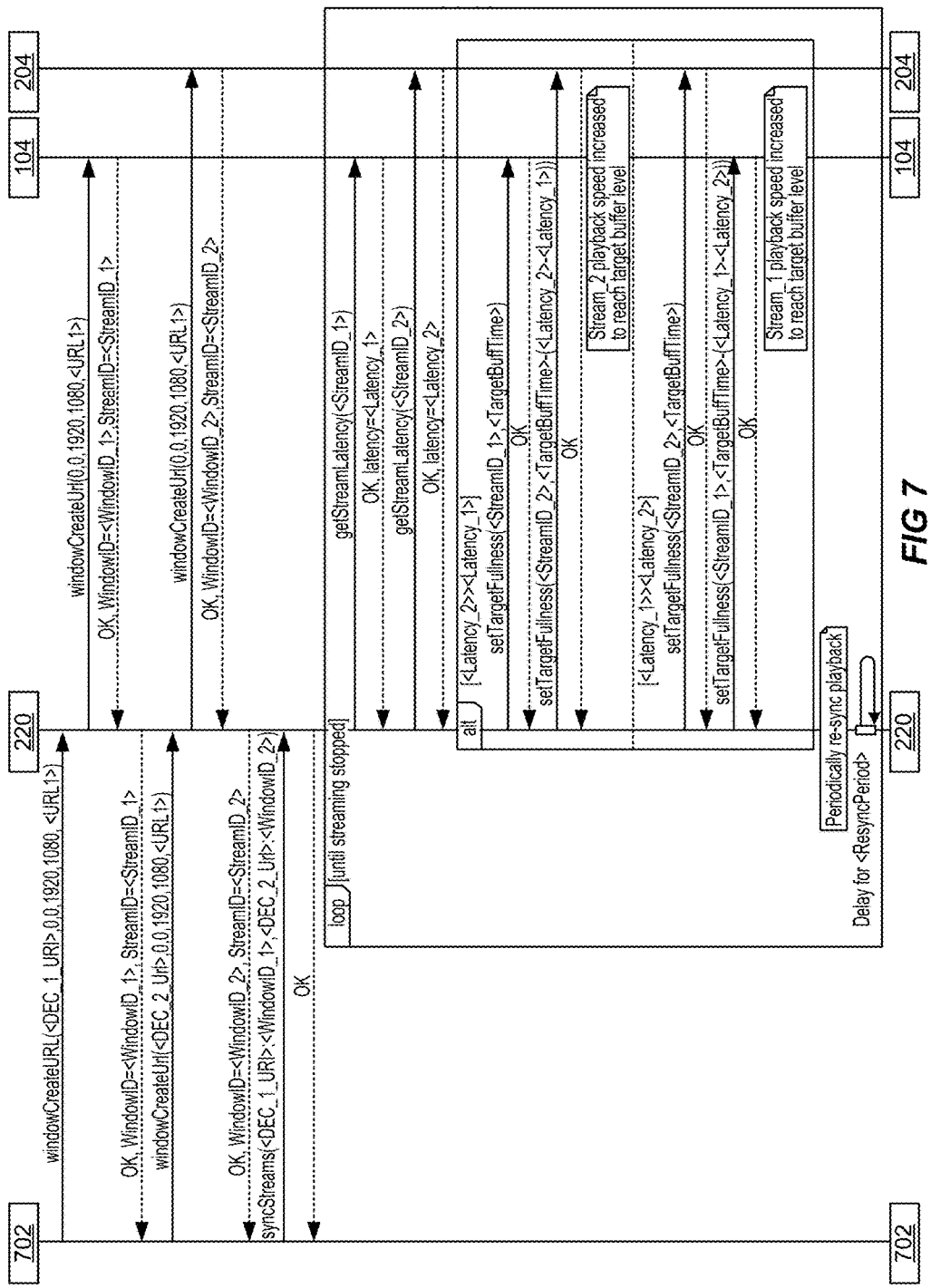
FIG. 7 illustrates an example of a sequence diagram of operations within system for implementing digital content synchronization having one source and multiple destinations, implemented in accordance with some embodiments.

FIG. 7 illustrates an example of a sequence diagram of operations within system for implementing digital content synchronization having one source and multiple destinations, implemented in accordance with some embodiments. As will be discussed in greater detail below, a coordinator may be implemented to coordinate the output of streams from decoders such that the streams, if displayed, are synchronized despite differences in transmission characteristics, such as different network latencies. In the example, shown in FIG. 7, several streams may be requested and provided to decoders such as decoder 104 and decoder 204.

In various embodiments, a client machine, such as client machine 702, is configured to implement a user interface (UI) that is configured to receive on or more inputs from a user. Client machine 702 may communicate with coordinator to initiate the decoding of streams at windows on the decoders, and such streams and windows may have unique identifiers. In some embodiments, client machine 702 may also be configured to initiate a synchronization request, as illustrated by "syncStreams".

In various embodiments, a coordinator is configured to communicate with the decoders to implement the synchronization request and synchronize outputs of the decoders. As shown in FIG. 7, synchronization may be implemented in a loop that lasts until the streams are terminated. In various embodiments, the coordinator may obtain stream latency information from the decoders. In various embodiments, the latency information may be determined based on a comparison between some relative time measure, such as a PTS, and a reference clock. In this way, latency information may be determined for each decoder and each stream at a frame level.

In various embodiments, the coordinator may implement one or more synchronization operations based on the identified latency information. For example, if a latency associated with decoder 204 is greater than a latency associated with decoder 104, then buffer utilization of decoder 204 may be modified or configured to compensate for the timing difference. In one example, a playback speed of the stream being buffered at decoder 204 may be increased to obtain a designated target buffer level. In another example, a buffer size may be modified to obtain the target buffer level. For example, the size of the buffer may be increased by, for example, the coordinator. In yet another example, one or more frames of the stream may be skipped or dropped, or alternatively repeated, to mitigate the latency and obtain the designated target buffer level. In another example, if a latency associated with decoder 104 is greater than a latency associated with decoder 104, then a buffer of decoder 104 may be modified or configured to compensate for the timing difference. For example, a playback speed of the stream being buffered at decoder 104 may be increased. As discussed above, other techniques such as buffer size modification or frame dropping may also be implemented.

Furthermore, as shown in FIG. 7, such synchronization may be implemented periodically throughout the duration of a media stream. Thus, the previously described synchronization operations may be implemented multiple times to maintain output synchronization amongst the decoders. In this way, synchronization of outputs of the decoders may be implemented independent and in addition to the implementation of synchronized switching discussed in greater detail below with reference to FIG. 10.

Figure 8:
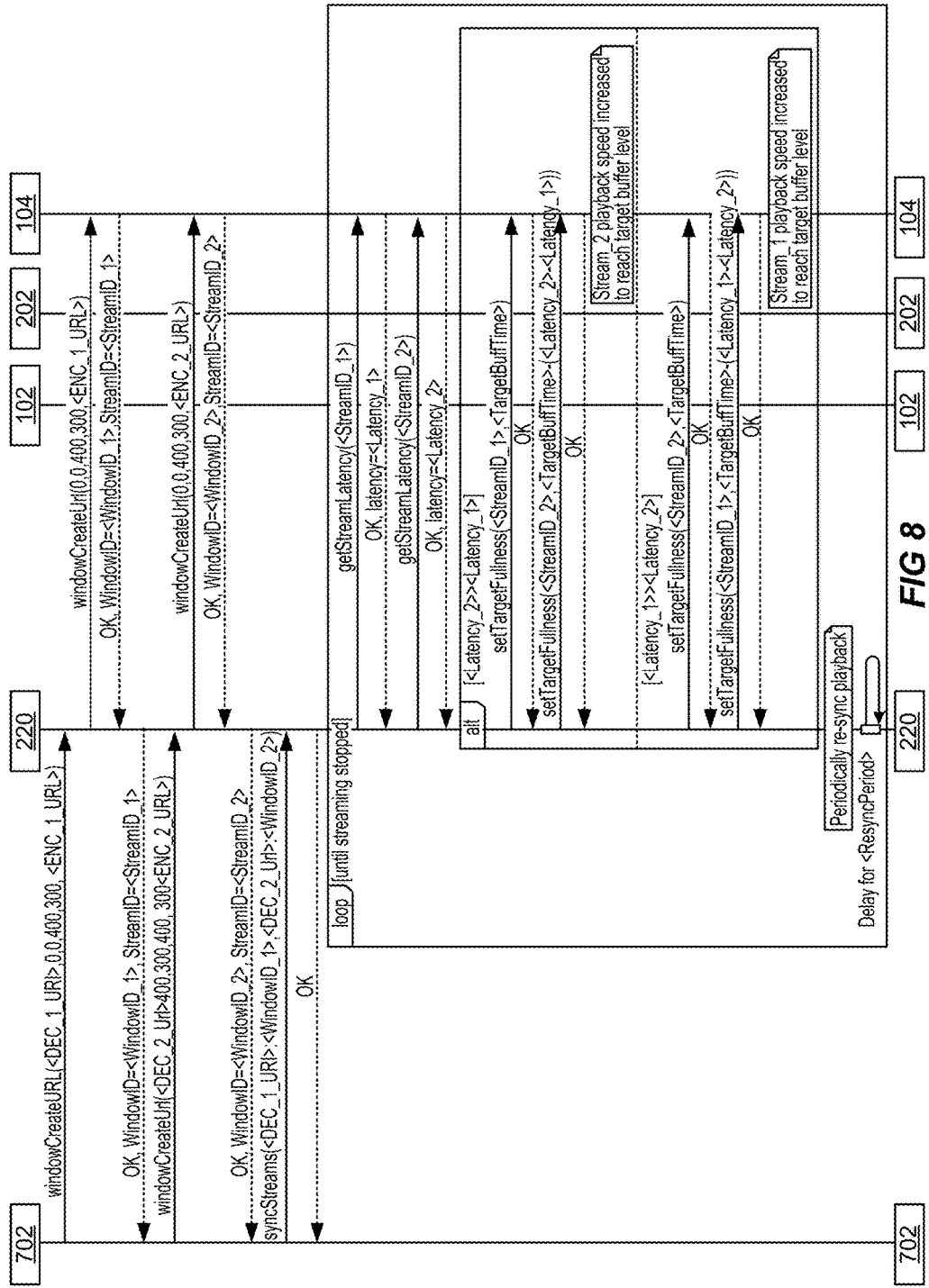
FIG. 8 illustrates an example of a sequence diagram of operations within system for implementing digital content synchronization having multiple sources to be displayed at multiple windows associated with a single decoder, implemented in accordance with some embodiments.

FIG. 8 illustrates an example of a sequence diagram of operations within system for implementing digital content synchronization having multiple sources to be displayed at multiple windows associated with a single decoder, implemented in accordance with some embodiments. As similarly discussed above, a coordinator may be implemented to coordinate the output of streams from decoders such that the streams, if displayed, are synchronized despite differences in transmission characteristics, such as different network latencies. In the example, shown in FIG. 8, several streams may be requested and generated by multiple encoders, such as encoder 102 and encoder 202, which may provide the streams to a single decoder such as decoder 104.

As also discussed above, a client machine, such as client machine 702, may request the generation of several media streams, and may also issue a synchronization request associated with such media streams. In response to the request, the coordinator may implement synchronization operations to synchronize outputs associated with such streams. As discussed above, the coordinator may obtain latency information for the streams. While, in this example, the streams are both being provided to the same decoder, differences associated with the encoders, such as different network topologies, may cause differences in stream timings. Thus, such latencies associated with the streams handled by the decoder may be different.

In various embodiments, if the latency associated with a second stream originating from encoder 202 is greater than a latency associated with a first stream originating from encoder 102, then buffer utilization of decoder 104 may be modified or configured to compensate for the timing difference. In one example, a playback speed of the second stream being buffered at decoder 104 may be decreased to obtain a designated target buffer level. In another example, if a latency associated with a first stream originating from encoder 102 is greater than a latency associated with a second stream originating from encoder 202, then a buffer of decoder 104 may be modified or configured to compensate for the timing difference. For example, a playback speed of the first stream may be decreased. In various embodiments, each stream handled by decoder 104 may have its own buffer, and each buffer may be modified independently. As also discussed above, such synchronization operations may be implemented periodically to maintain synchrony between the streams in conjunction with the synchronized switching described in greater detail below. Moreover, other techniques such as frame dropping or replicating may also be implemented.

Figure 9:
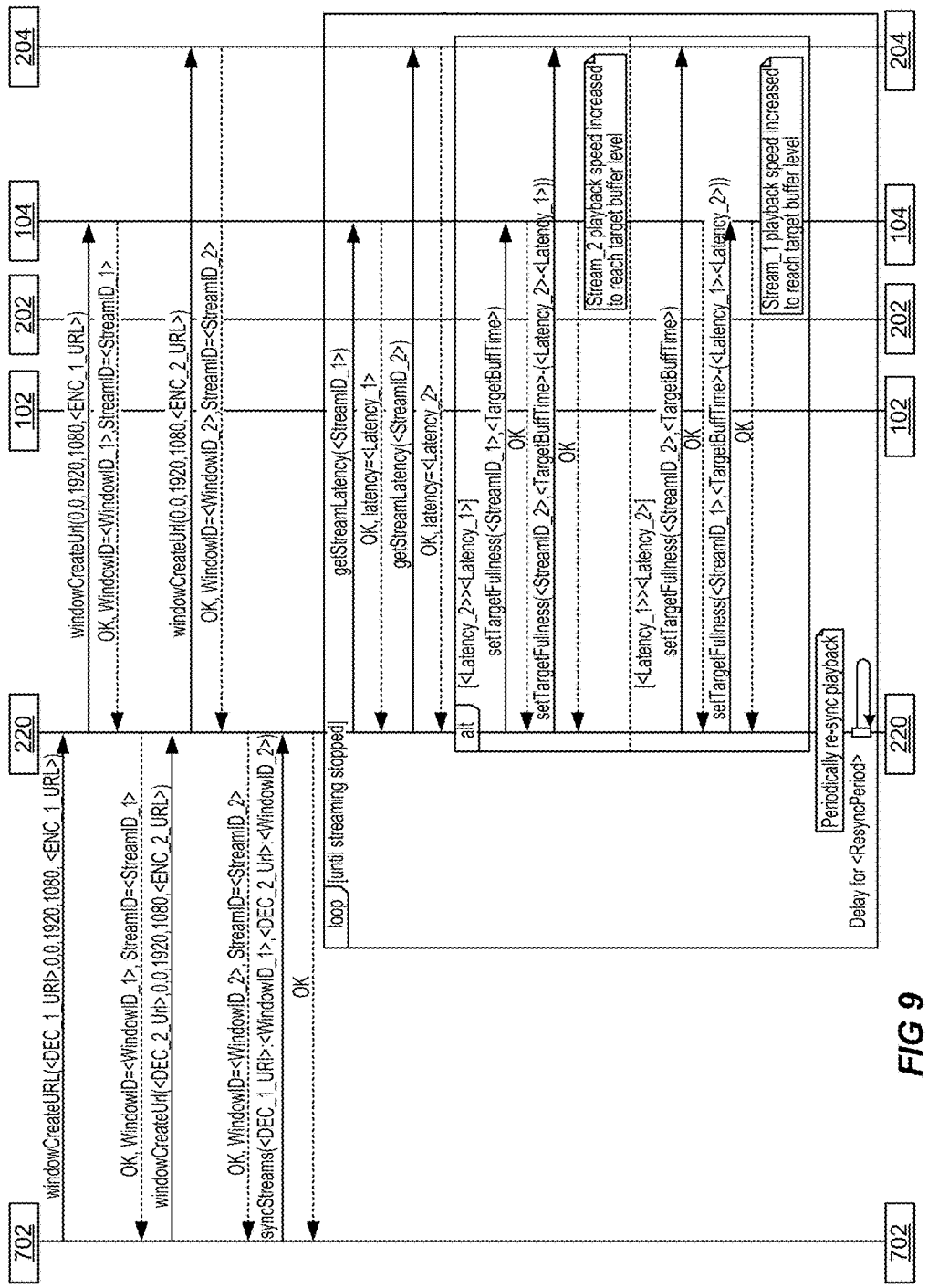
FIG. 9 illustrates an example of a sequence diagram of operations within system for implementing digital content synchronization having multiple sources and multiple destinations, implemented in accordance with some embodiments.
Figure 10:
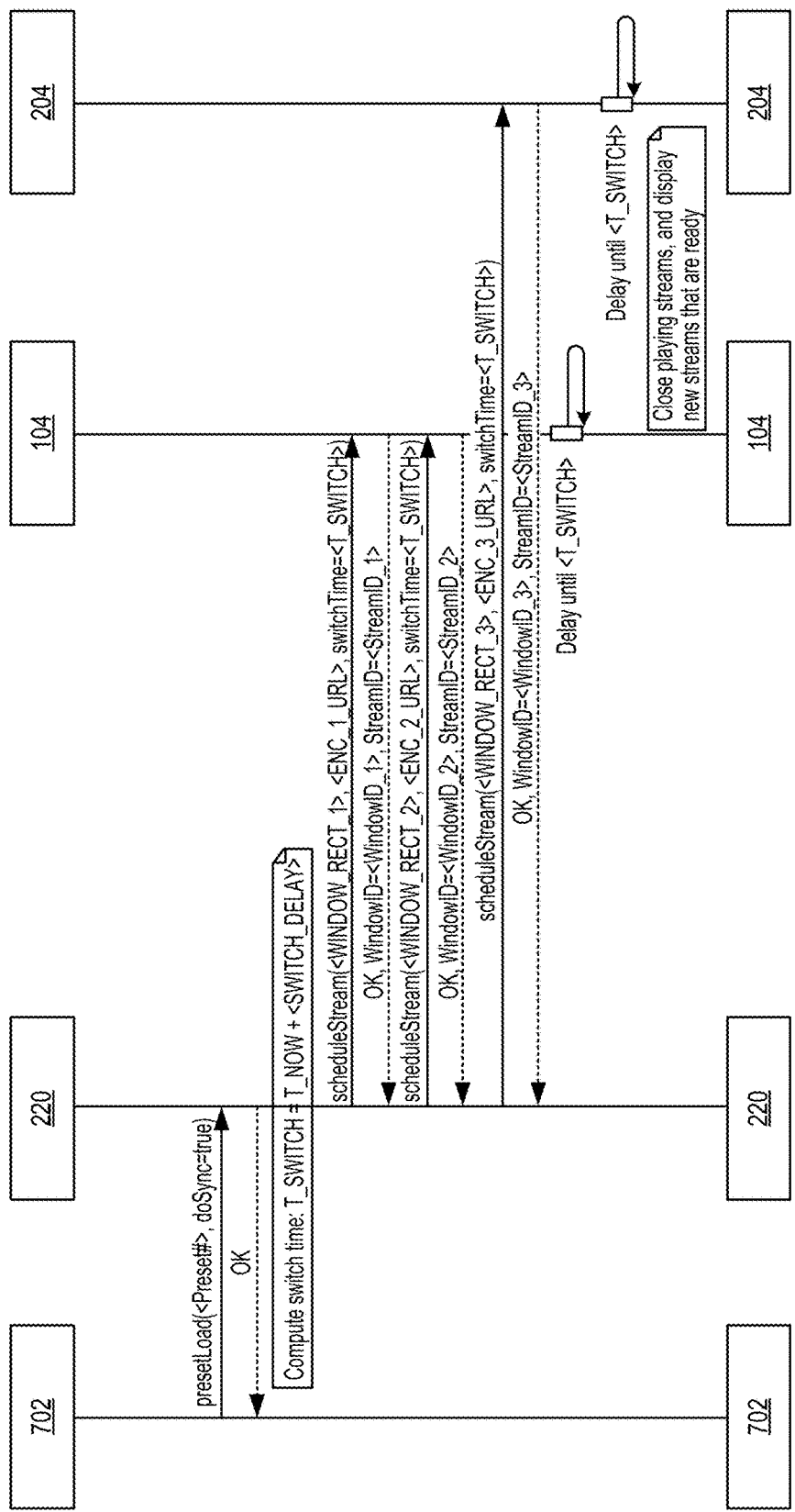
FIG. 10 illustrates an example of a sequence diagram of additional operations within system for implementing digital content synchronization, implemented in accordance with some embodiments.

FIG. 9 illustrates an example of a sequence diagram of operations within system for implementing digital content synchronization having multiple sources and multiple destinations, implemented in accordance with some embodiments. As similarly discussed above, a coordinator may be implemented to coordinate the output of streams from decoders such that the streams, if displayed, are synchronized despite differences in transmission characteristics, such as different network latencies. In the example, shown in FIG. 9, several streams may be requested and generated by multiple encoders, such as encoder 102 and encoder 202, which may provide the streams to multiple decoders such as decoder 104 and decoder 204.

As also discussed above, a client machine, such as client machine 702, may request the generation of several media streams, and may also issue a synchronization request associated with such media streams. In response to the request, the coordinator may implement synchronization operations to synchronize outputs associated with such streams. As discussed above, the coordinator may obtain latency information for the streams. In various embodiments, a first stream may be encoded by encoder 102 and provided to decoder 104, and a second stream may be encoded by encoder 202 and provided to decoder 204.

In various embodiments, if the latency associated with the second stream originating from encoder 202 is greater than a latency associated with the first stream originating from encoder 102, then buffer utilization of decoder 204 may be modified or configured to compensate for the timing difference. In one example, a playback speed of the second stream being buffered at decoder 204 may be increased to obtain a designated target buffer level. In another example, if a latency associated with a first stream originating from encoder 102 is greater than a latency associated with a second stream originating from encoder 202, then a buffer of decoder 104 may be modified or configured to compensate for the timing difference. For example, a playback speed of the first stream may be increased. As also discussed above, such synchronization operations may be implemented periodically to maintain synchrony between the streams in conjunction with the synchronized switching described in greater detail below. Moreover, other techniques such as frame dropping or replicating may also be implemented.

FIG. 10 illustrates an example of a sequence diagram of additional operations within system for implementing digital content synchronization, implemented in accordance with some embodiments. In various embodiments, a system component, such as a coordinator, is configured to implement a synchronized switch that may be applied to multiple media streams. As shown in FIG. 10, a designated switch time may be determined and may identify when the synchronized switch event is to occur. The designated switch time may be determined based, at least in part, on switch delay. In various embodiments, the switch time is determined based on a combination of an estimated switch time and an estimate of network latency. The estimated switch time may be a designated parameter set by an entity, such as a user or administrator, or may be inferred from previous switches. The network latency may be determined based on latency information derived by the coordinator.

The designated switch time may be conveyed to the appropriate decoders, such as decoder 104 and decoder 204. As shown in FIG. 10, there may be multiple streams being decoded at a particular decoder, and a switch time may be conveyed for each stream. In various embodiments, the decoders are configured to implement a local delay prior to execution of the switching command. More specifically, a particular decoder may determine a local delay based on the identified switch time and implement the local delay prior to executing the switch. In this way, each decoder waits until the designated switch time to implement its respective switch operation. In this way, all of the media streams are switched simultaneously.

Figure 11:
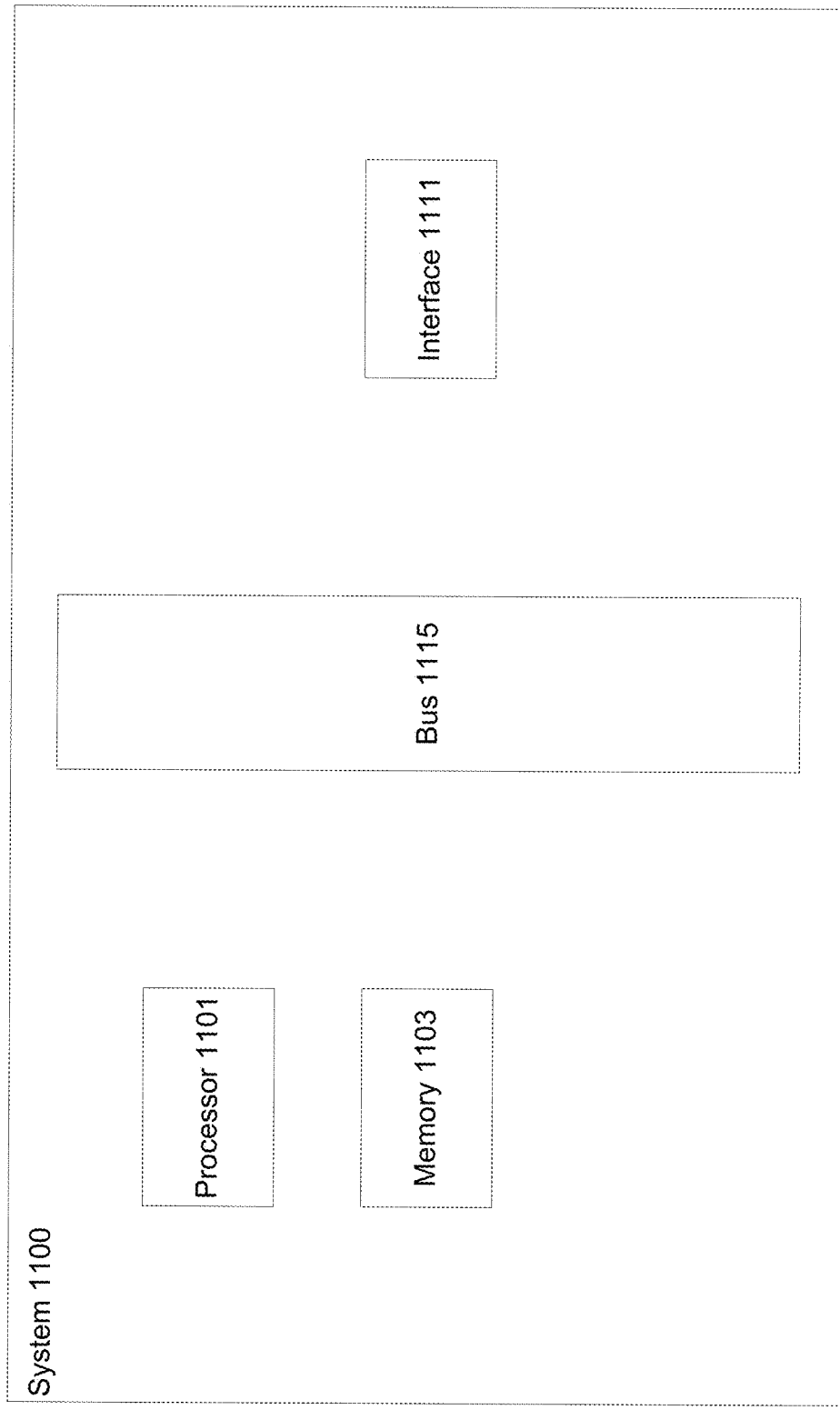
FIG. 11 illustrates an example of a processing system.

FIG. 11 illustrates an example of a processing system. According to particular embodiments, a system 1100 suitable for implementing particular embodiments of the present invention includes a processor 1101, a memory 1103, an interface 1111, and a bus 1115 (e.g., a PCI bus or other interconnection fabric). In various embodiments, system 1100 may be configured to operate as one or more system components, such as a coordinator, an encoder, or a decoder. When acting under the control of appropriate software or firmware, the processor 1101 is responsible for configuring and implementing synchronization of switching events, as discussed above. Various specially configured devices can also be used in place of a processor 1101 or in addition to processor 1101. The interface 1111 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 1100 is a coordinator configured to configure and implement the synchronization of switching events. For example, the system 1100 may be configured as coordinator 220 shown in FIG. 2. In various embodiments, additional instances of system 1100 may also be used to implement other components, such as a transmitter or a receiver, and their respective nodes. More specifically, additional instances of system 1100 may also be used to implement transmitter 108 and receiver 118 shown in FIG. 1. Although particular embodiments are described, it should be recognized that a variety of alternative configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A system comprising:
    a plurality of transmitters comprising a plurality of encoders, wherein each encoder of the plurality of the encoders comprises one or more processors configured to encode one or more media steams;
    a plurality of receivers comprising a plurality of decoders, wherein each decoder of the plurality of decoders comprises one or more processors configured to decode the one or more media streams, the decoder further comprising at least one packet receiver and at least one buffer, the buffer having a configurable buffer depth and being located between the at least one packet receiver and the one or more processors;
    a plurality of display devices configured to display a plurality of outputs of the plurality of decoders; and
    a coordinator communicatively coupled to the plurality of encoders and the plurality of decoders, the coordinator comprising one or more processors configured to:
        start a plurality of media streams being encoded by the plurality of encoders and decoded by the plurality of decoders;
        synchronize the plurality of media streams while the plurality of media streams is being buffered by the plurality of decoders and prior to decoding; and
        implement a synchronized switching event associated with the plurality of media streams, the synchronized switching event being based on a coordination time window identifying a target switching time for the plurality of decoders, and determined based on an estimate of an earliest available time for all decoders associated with the synchronized switching event.

2. The system of claim 1, wherein the synchronizing of the plurality of media streams comprises adjusting a buffer size of each of the decoders associated with the plurality of media streams.

3. The system of claim 2, wherein the implementing of the synchronized switch event further comprises:
    determining the coordination time window associated with the synchronized switch event; and
    configuring at least some of the plurality of decoders to implement the synchronized switch event.

4. The system of claim 3, wherein the synchronized switch event switches at least two outputs of the plurality of decoders to at least two of the plurality of media streams that are being buffered.

5. The system of claim 1, wherein at least some of the plurality of encoders and the plurality of decoders have different latencies.

6. The system of claim 1, wherein the plurality of decoders is configured to generate outputs displayed on a display device.

7. The system of claim 6, wherein the display device is configured to have multiple display windows.

8. The system of claim 1, wherein the plurality of media streams is high-bandwidth digital content (HDCP) compliant.

9. A system comprising:
    a plurality of encoders, wherein each encoder of the plurality of the encoders comprises one or more processors configured to encode one or more media steams;
    a plurality of decoders, wherein each decoder of the plurality of decoders comprises one or more processors configured to decode the one or more media streams, the decoder further comprising at least one packet receiver and at least one buffer, the buffer having a configurable buffer depth and being located between the at least one packet receiver and the one or more processors; and
    a coordinator communicatively coupled to the plurality of encoders and the plurality of decoders, the coordinator comprising one or more processors configured to:
        start a plurality of media streams being encoded by the plurality of encoders and decoded by the plurality of decoders;
        synchronize the plurality of media streams while the plurality of media streams is being buffered by the plurality of decoders and prior to decoding; and
        implement a synchronized switching event associated with the plurality of media streams, the synchronized switching event being based on a coordination time window identifying a target switching time for the plurality of decoders, and determined based on an estimate of an earliest available time for all decoders associated with the synchronized switching event.

10. The system of claim 9, wherein the synchronizing of the plurality of media streams comprises adjusting a buffer size of each of the decoders associated with the plurality of media streams.

11. The system of claim 10, wherein the implementing of the synchronized switch event further comprises:
   determining the coordination time window associated with the synchronized switch event; and
   configuring at least some of the plurality of decoders to implement the synchronized switch event.

12. The system of claim 11, wherein the synchronized switch event switches at least two outputs of the plurality of decoders to at least two of the plurality of media streams that are being buffered.

13. The system of claim 9, wherein at least some of the plurality of encoders and the plurality of decoders have different latencies.

14. The system of claim 9, wherein the plurality of decoders is configured to generate outputs displayed on a display device.

15. The system of claim 14, wherein the display device is configured to have multiple display windows.

16. The system of claim 9, wherein the plurality of media streams is high-bandwidth digital content (HDCP) compliant.

17. A method comprising:
   streaming a plurality of media streams in a background, the plurality of media streams being encoded by the plurality of encoders and decoded by the plurality of decoders;
   synchronizing, using one or more processors of a coordinator, the plurality of media streams while the plurality of media streams is being buffered by the plurality of decoders and prior to decoding; and
   implementing, using one or more processors of the coordinator, a synchronized switching event associated with the plurality of media streams, the synchronized switching event switching at least two outputs of the plurality of decoders to at least two of the plurality of media streams that are being buffered, and the synchronized switching event being based on a coordination time window identifying a target switching time for the plurality of decoders, and determined based on an estimate of an earliest available time for all decoders associated with the synchronized switching event.

18. The method of claim 17, wherein the synchronizing of the plurality of media streams comprises:
   adjusting a buffer size of each of the decoders associated with the plurality of media streams.

19. The method of claim 18, wherein the implementing of the synchronized switch event further comprises:
   determining the coordination time window associated with the synchronized switch event; and
   configuring at least some of the plurality of decoders to implement the synchronized switch event.

20. The method of claim 17, wherein the plurality of media streams is high-bandwidth digital content (HDCP) compliant.

* * * * *